United States Patent
Kim et al.

(10) Patent No.: US 8,061,150 B2
(45) Date of Patent: Nov. 22, 2011

(54) APPARATUS FOR SUPERCOOLING, AND METHOD OF OPERATING THE SAME

(75) Inventors: Su-Cheong Kim, Busan (KR); Jong-Min Shin, Busan (KR); Su-Won Lee, Changwon (KR); Cheol-Hwan Kim, Gimhae (KR); Yong-Chol Kwon, Changwon (KR); Ku-Young Son, Busan (KR)

(73) Assignee: LG Electronics Inc., Seoul (KR)

( * ) Notice: Subject to any disclaimer, the term of this patent is extended or adjusted under 35 U.S.C. 154(b) by 699 days.

(21) Appl. No.: 12/279,670

(22) PCT Filed: Nov. 7, 2006

(86) PCT No.: PCT/KR2006/004648
§ 371 (c)(1),
(2), (4) Date: Aug. 15, 2008

(87) PCT Pub. No.: WO2007/094549
PCT Pub. Date: Aug. 23, 2007

(65) Prior Publication Data
US 2010/0186431 A1    Jul. 29, 2010

(30) Foreign Application Priority Data

Feb. 15, 2006  (KR) .................. 10-2006-0014692
Jul. 1, 2006   (KR) .................. 10-2006-0061689
Jul. 1, 2006   (KR) .................. 10-2006-0061693

(51) Int. Cl.
*F25D 17/06* (2006.01)

(52) U.S. Cl. ............................................ 62/89; 62/449

(58) Field of Classification Search .............. 62/89, 449, 62/513, 351, 467; 99/473; 426/237; 165/59
See application file for complete search history.

(56) References Cited

U.S. PATENT DOCUMENTS

| | | | | |
|---|---|---|---|---|
| 3,589,126 A * | 6/1971 | Zotto | ............................. | 60/664 |
| 4,304,293 A * | 12/1981 | Scheiwe et al. | ............... | 165/247 |
| 4,529,488 A * | 7/1985 | Kotani et al. | ................... | 205/44 |
| 4,727,726 A * | 3/1988 | Mitani et al. | ................. | 62/238.6 |
| 6,679,321 B2 * | 1/2004 | Jin | ................................ | 165/236 |
| 2003/0068414 A1 | 4/2003 | Ito | | |

FOREIGN PATENT DOCUMENTS

| | | |
|---|---|---|
| JP | 59-151834 A | 8/1984 |
| JP | 5-93569 A | 4/1993 |
| JP | 6-257924 A | 9/1994 |
| JP | 2001-86967 A | 4/2001 |
| JP | 2002-364968 A | 12/2002 |
| KR | 10-1996-0034941 | 10/1996 |
| KR | 10-2005-0002271 A | 1/2005 |
| KR | 10-2006-0013721 A | 2/2006 |
| WO | WO-98/41115 A1 | 9/1998 |

* cited by examiner

*Primary Examiner* — Mohammad Ali
(74) *Attorney, Agent, or Firm* — Birch, Stewart, Kolasch & Birch, LLP

(57) ABSTRACT

The present invention discloses an apparatus for supercooling and a method of operating the same which can solve supercooling release of a supercooled space and prevent external exposure of energy such as an electric field. The apparatus for supercooling includes a space cooled by cool air, for maintaining an inside object in a supercooled state by supply of energy preventing the object from being converted into a solid phase, a sensing unit for sensing supercooling release of the space or the object, and a heater engaged with the sensing unit, for applying heat to the space or the object.

15 Claims, 11 Drawing Sheets

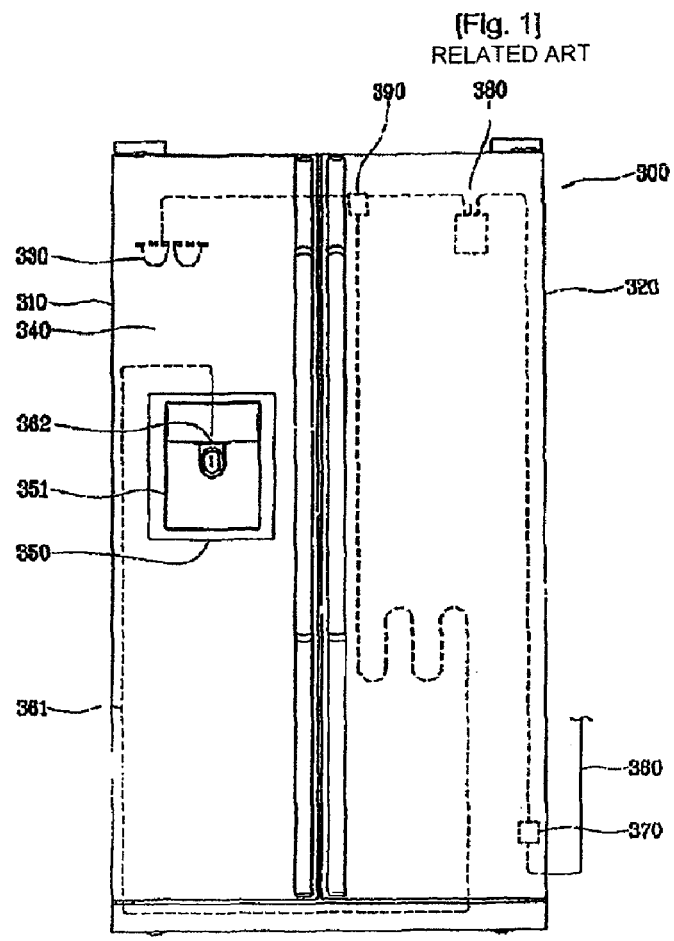
[Fig. 1]
RELATED ART
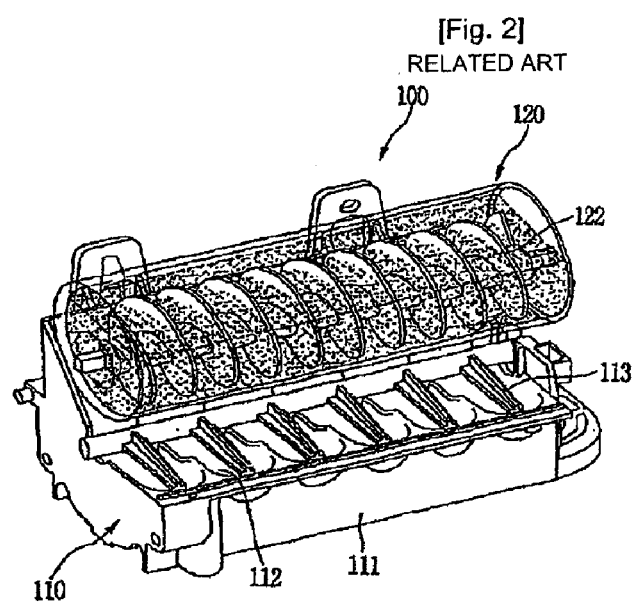
[Fig. 2]
RELATED ART

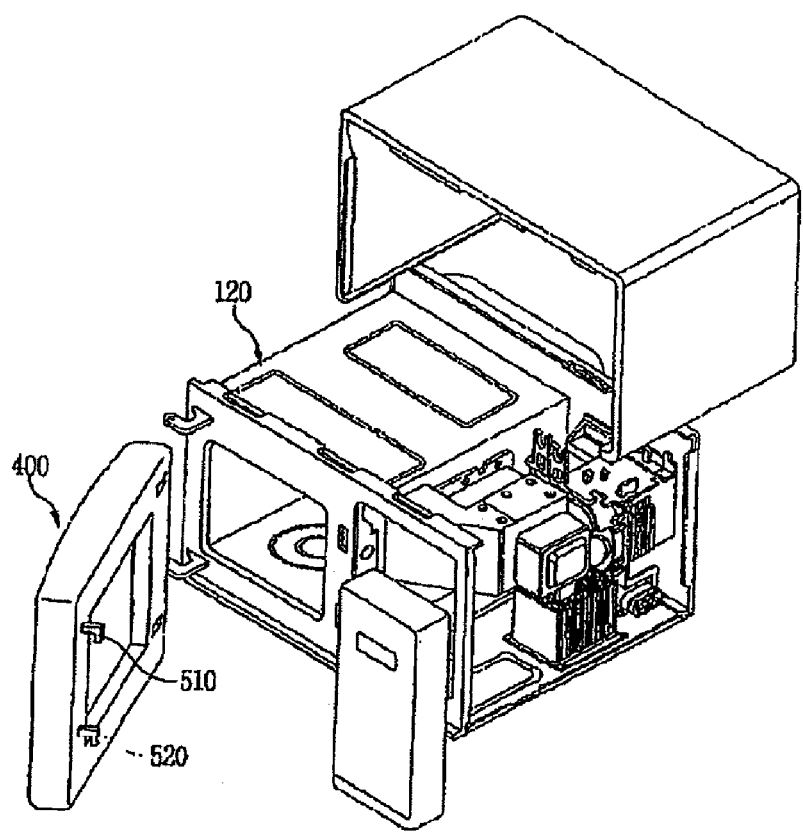
[Fig. 3]
RELATED ART

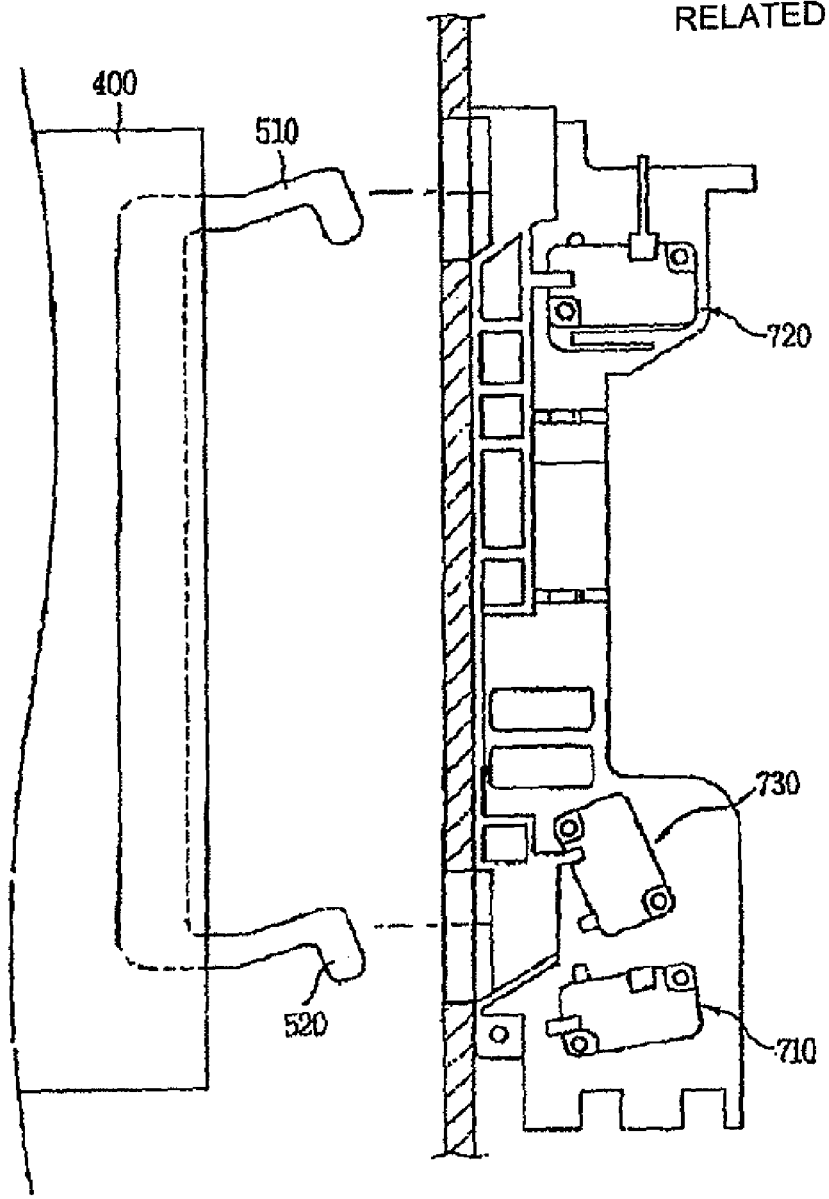
[Fig. 4]
RELATED ART

[Fig. 5]
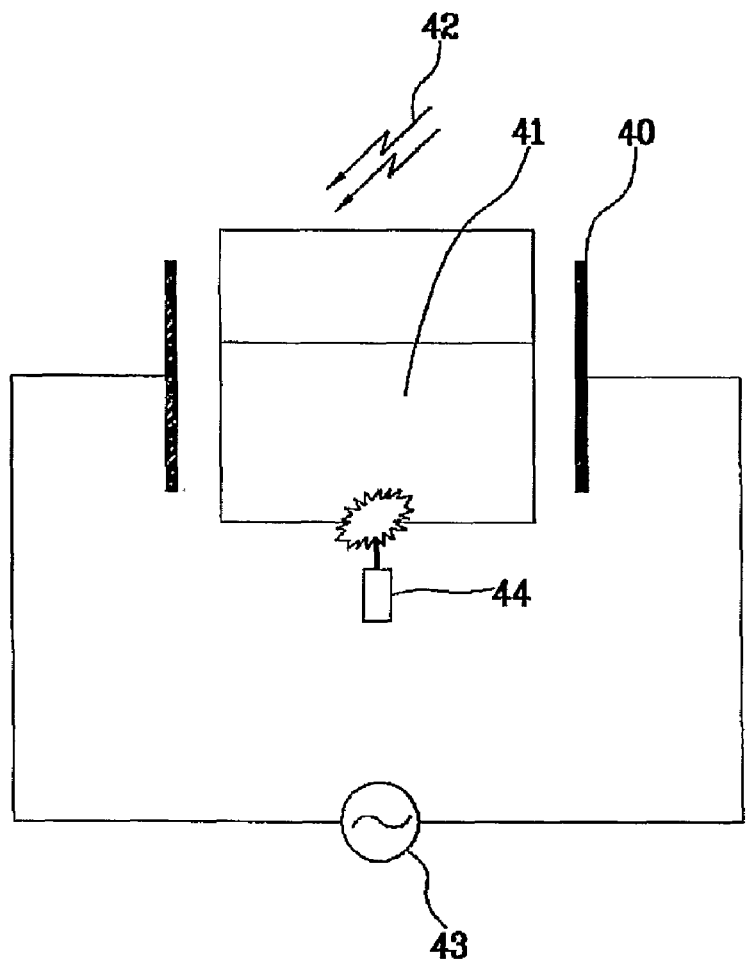
[Fig. 6]
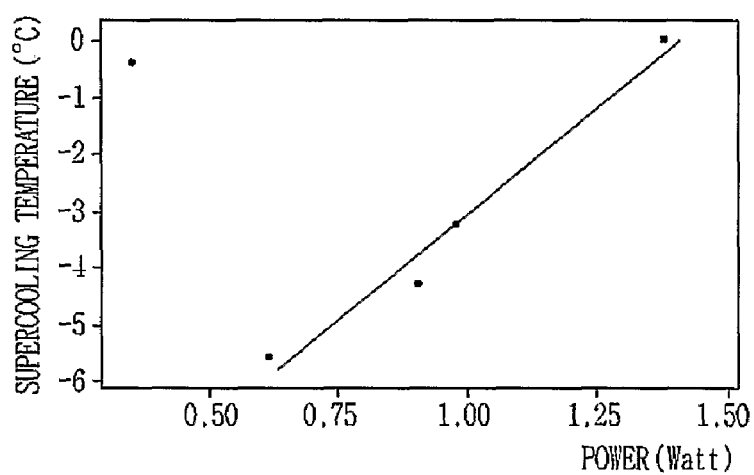

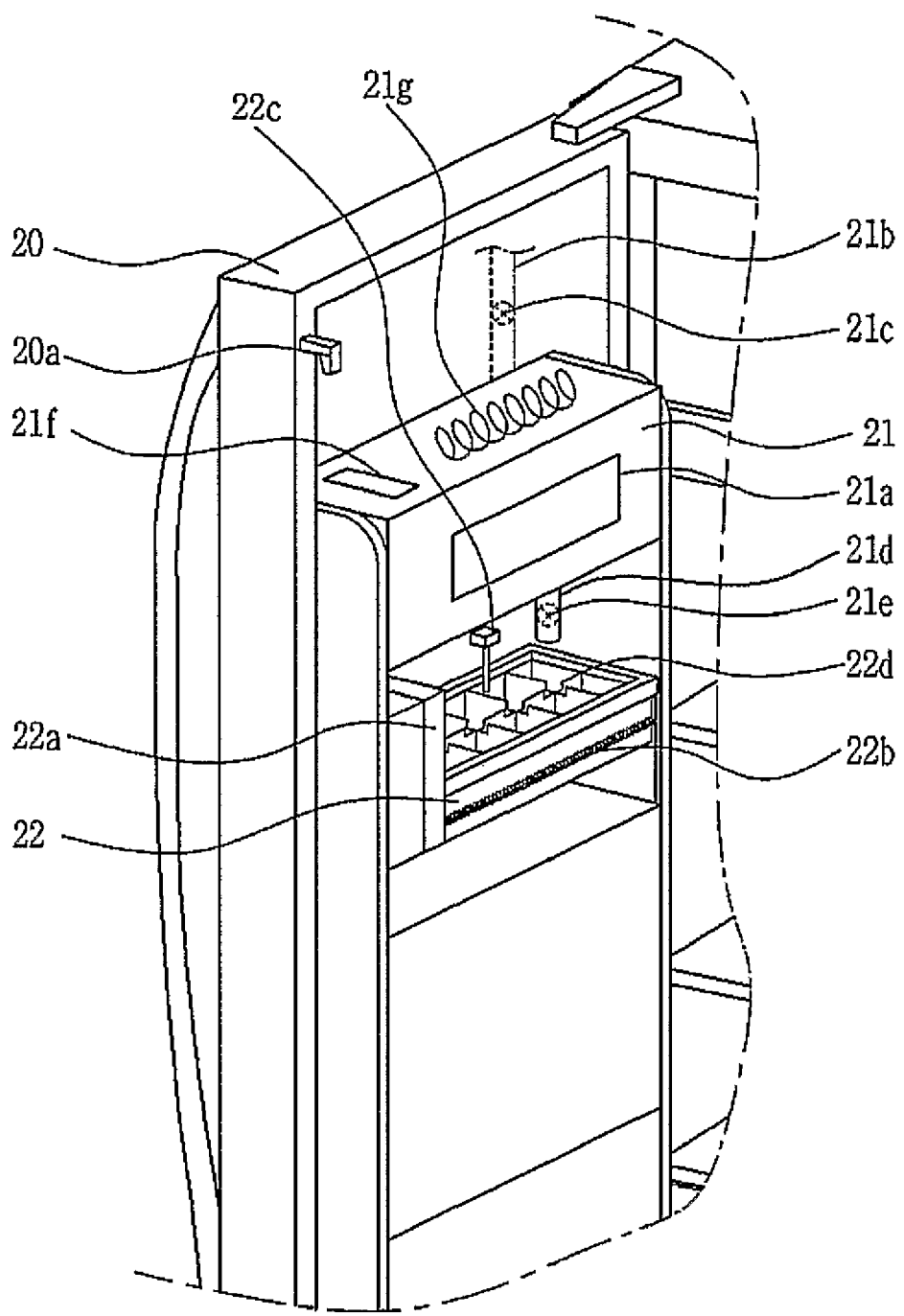
[Fig. 7]

[Fig. 8]
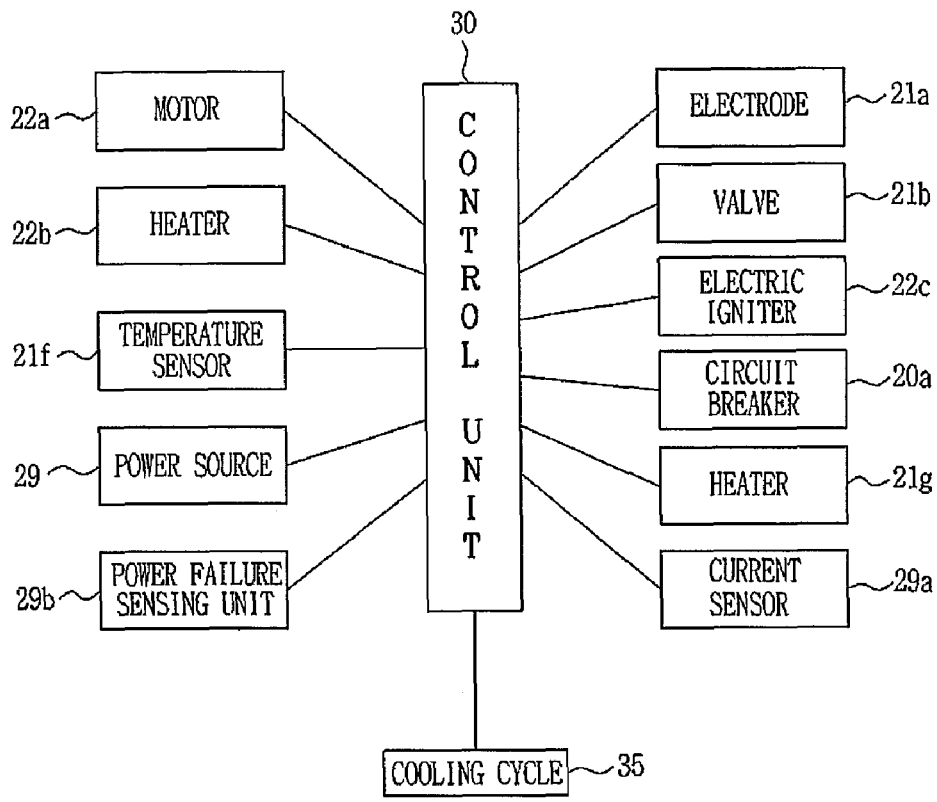
[Fig. 9]
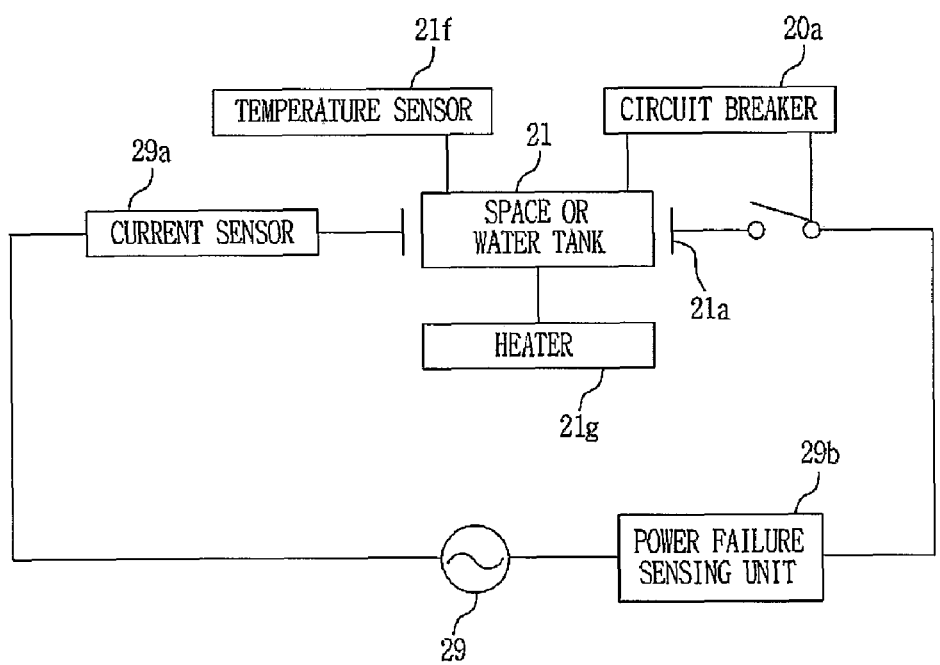

[Fig. 10]
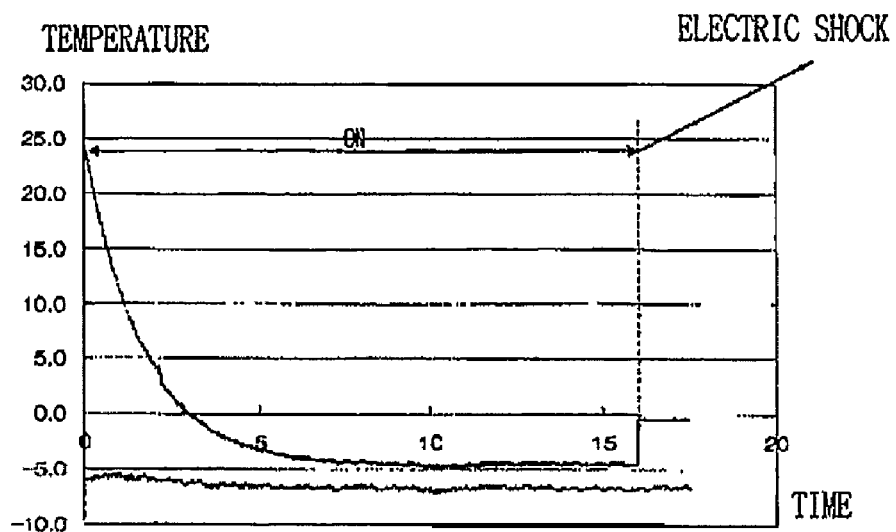
[Fig. 11]
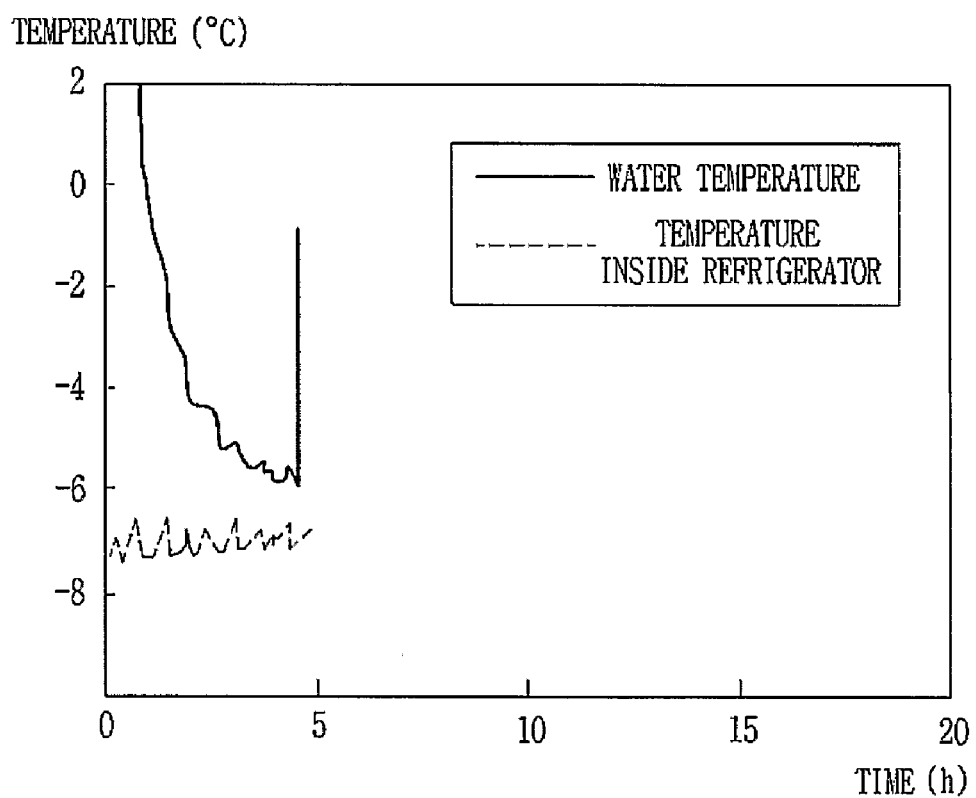

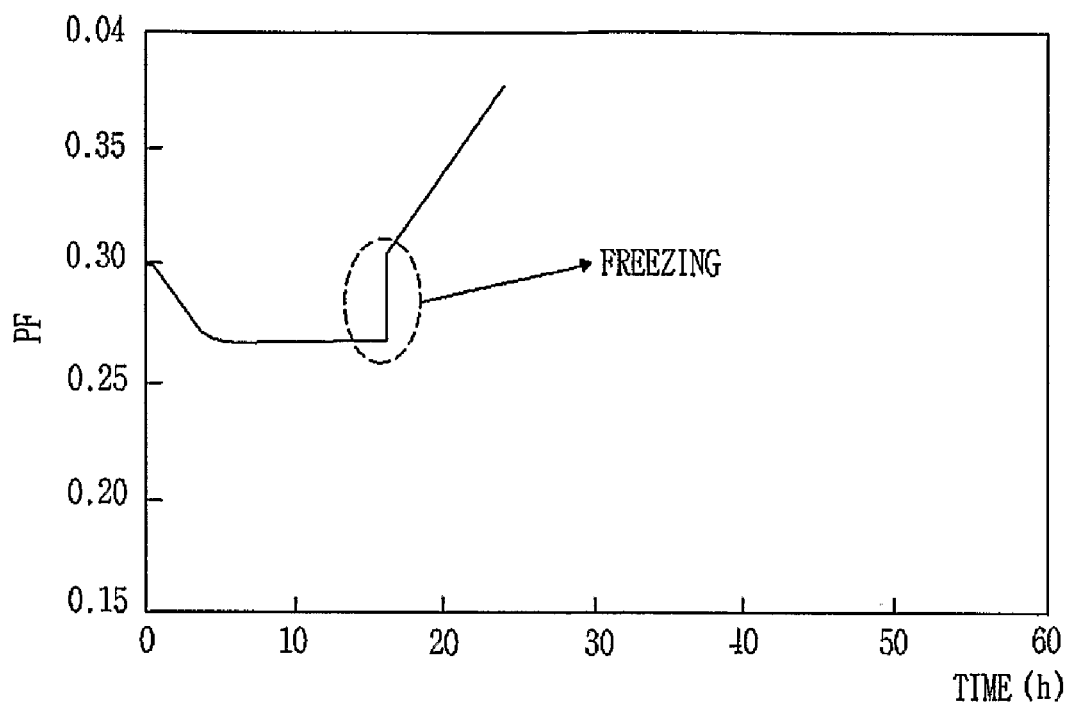
[Fig. 12]
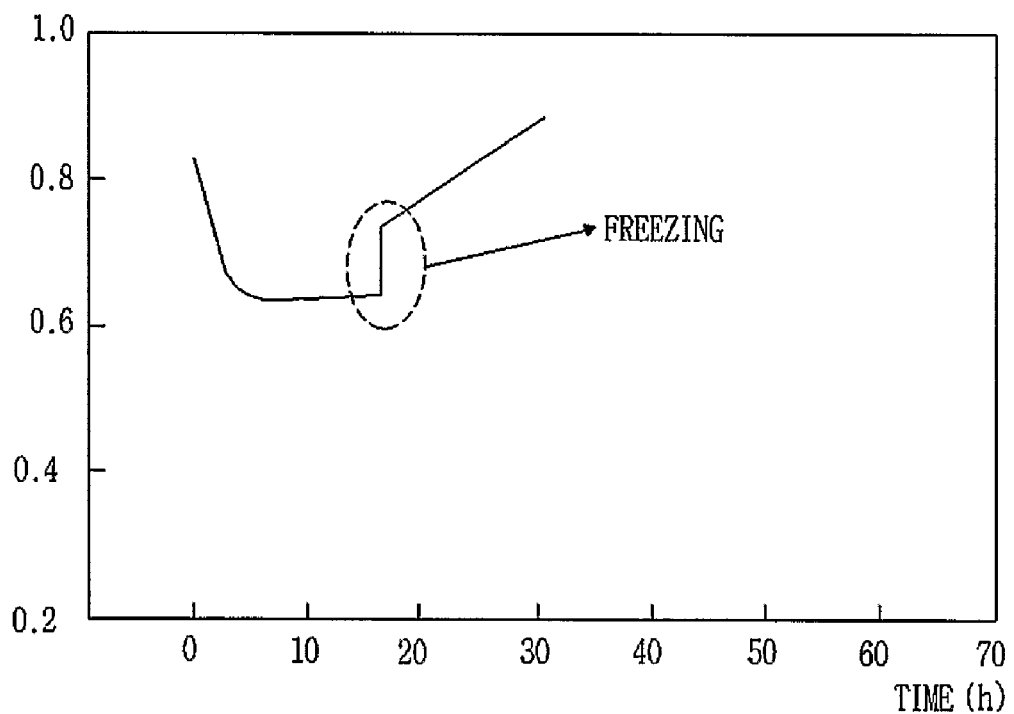
[Fig. 13]

[Fig. 14]
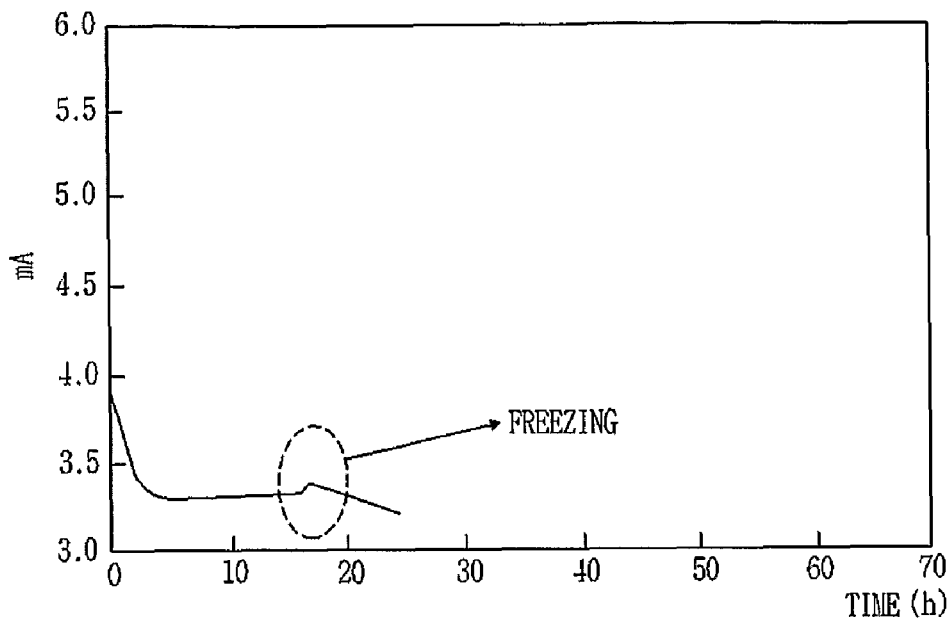
[Fig. 15]
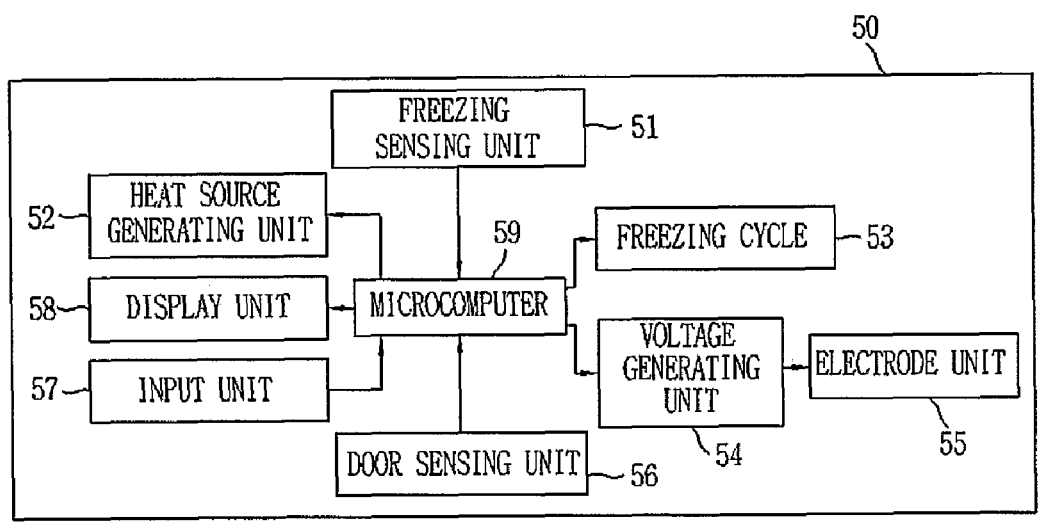

[Fig. 16]
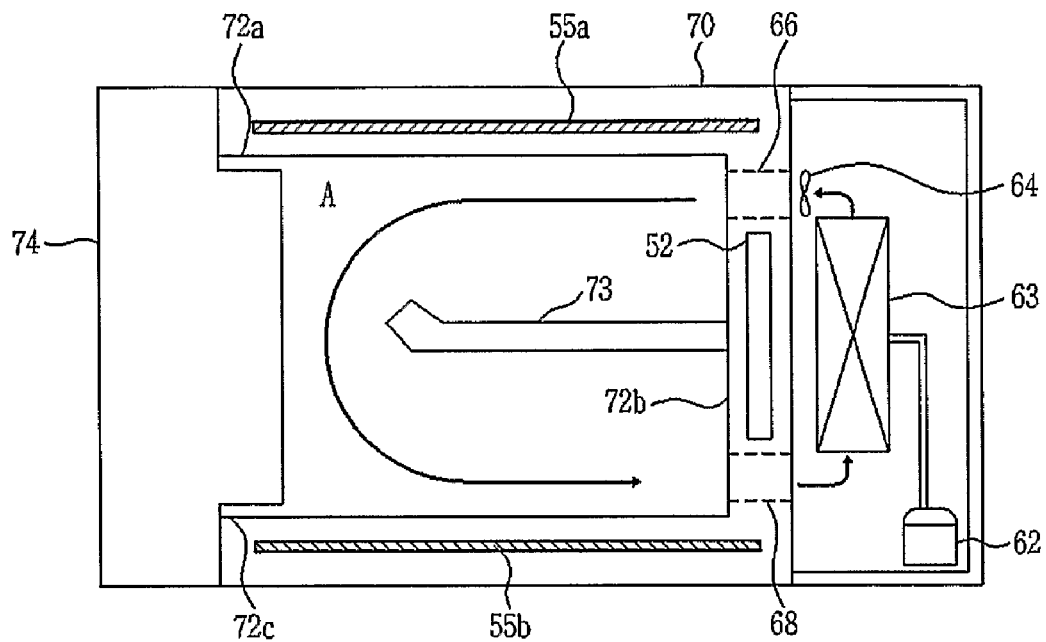
[Fig. 17]
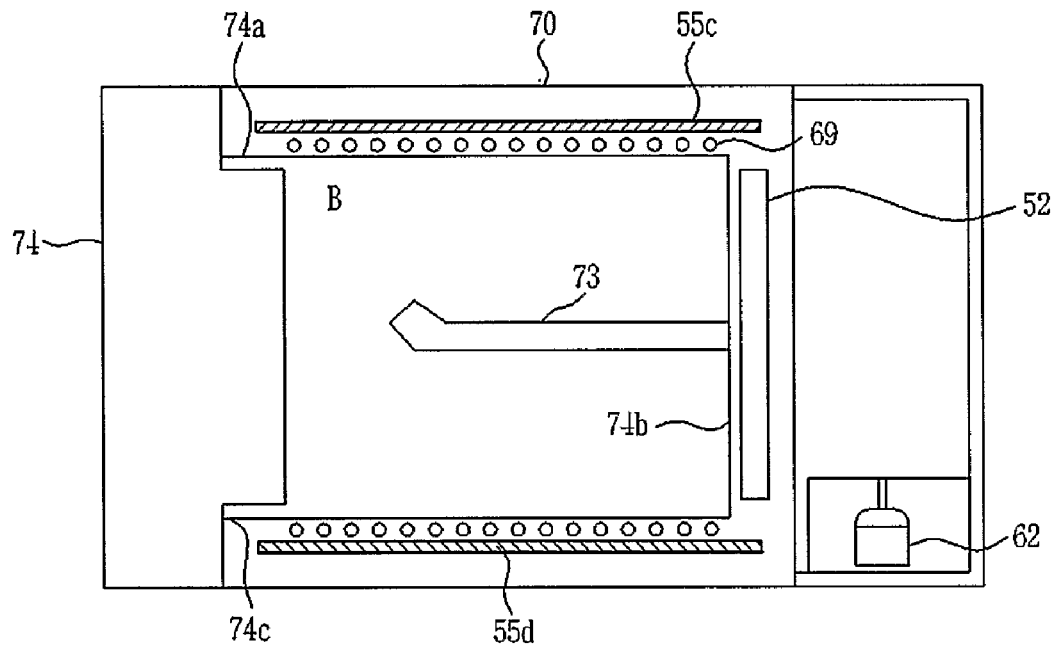

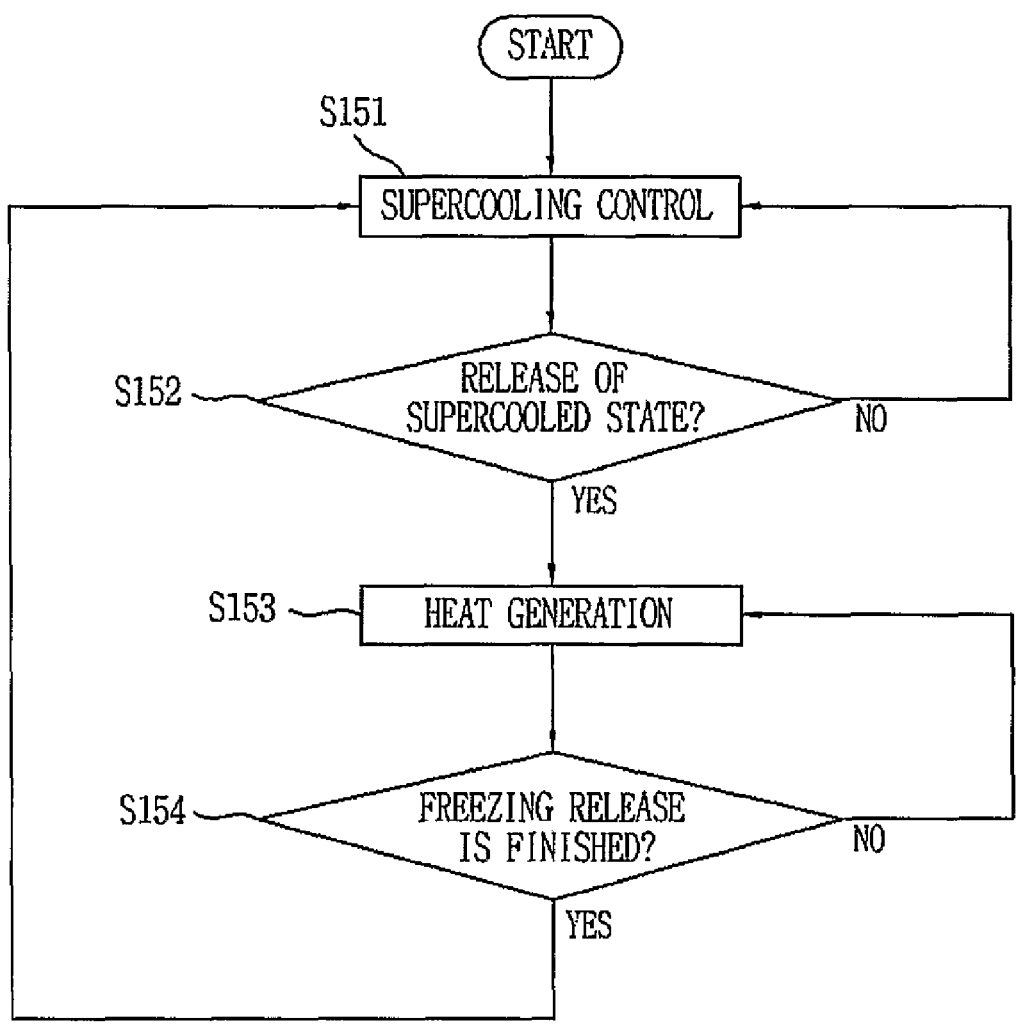
[Fig. 18]

APPARATUS FOR SUPERCOOLING, AND METHOD OF OPERATING THE SAME

TECHNICAL FIELD

The present invention relates to an apparatus for supercooling and a method of operating the same, and more particularly, to an apparatus for supercooling and a method of operating the same which can solve supercooling release of a supercooled space and prevent external exposure of energy such as an electric field.

BACKGROUND ART

Supercooling means that a liquid such as water is not transited to a solid but maintained in a high temperature phase, namely, a liquid phase even below a phase transition temperature to the solid. Water drops can be supercooled in the natural state. In addition, water or beverages may be incidentally supercooled in a general refrigerator. A freezing method disclosed under Japan Laid-Open Patent Official Gazette S59-151834 and a freezing method and a refrigerator disclosed under Japan Laid-Open Patent Official Gazette 2001-086967 apply the supercooling principle to the refrigerator. An electric field or a magnetic field is applied to foods of the refrigerator, so that the foods can be maintained in a supercooled state below a phase transition temperature. An electrostatic field processing method disclosed under International Publication Official Gazette WO/98/41115 suggests various types of electrode structures that can be used to supercool and thaw foods.

FIG. 1 is a structure view illustrating a conventional refrigerator including a dispenser. The refrigerator 300 includes a freezing chamber 310 and a refrigerating chamber 320. An ice maker 330 is installed in the freezing chamber 310, and the dispenser 350 is installed on the freezing chamber door 340. A passage 360 is formed to supply water to the ice maker 330 and the dispenser 350, and connected to an external water supply source (not shown). A first valve 370, a filter 380 and a second valve 390 are disposed on the passage 360. The first valve 370 controls water supply from the external water supply source to the refrigerator 300, the filter 380 filters water, and the second valve 390 controls water supply to the ice maker 330 and the dispenser 350.

On the other hand, the first valve 370 and the second vale 390 are controlled by a control unit (not shown) of the refrigerator 300. The passage 360 includes a passage 361 for supplying water to the dispenser 350. Water flowing through the passage 361 is cooled by heat exchange with the freezing chamber 310, and discharged through an outlet 362 of the passage 361 or an outlet 351 of the dispenser 350.

FIG. 2 is a structure view illustrating a transparent ice maker disclosed under Korea Laid-Open Patent Official Gazette 2006-0013721. The transparent ice maker 100 includes a supercooling means 120 using blades 122. Thin plate ice is laminated by supplying supercooled water made by the supercooling means 120 to an ice making means 110 including an ice tray 111, an ice making chamber 112 and ejectors 113 at very small quantities, thereby malting transparent ice.

FIGS. 3 and 4 are structure views illustrating a microwave oven for generating microwaves disclosed under Korea Laid-Open Patent Official Gazette 2005-0002271. The microwave oven includes a door 400 and a main body 120. The door 400 has latches 510 and 520. The main body 120 has switches 710, 720 and 730. By this configuration, when the door 400 is opened, generation of microwaves is intercepted by a mechanical method without the help of a control unit.

The conventional refrigerator of FIG. 1 does not provide a supercooled liquid. The conventional transparent ice maker of FIG. 2 supercools water by the mechanical method using the blades, and makes the thin plate ice by supplying the supercooled water at very small quantities. Therefore, the conventional transparent ice maker cannot rapidly make slush or ice. In the case that the supercooled water is transited to a solid phase and frozen, the conventional art cannot solve the problem.

In the general refrigerator, when foods are kept in the storing chamber in the supercooled state, they are often frozen.

DISCLOSURE OF INVENTION

Technical Problem

An object of the present invention is to provide an apparatus for supercooling and a method of operating the same which can sense supercooling release of the apparatus for supercooling having a space for maintaining an object in a supercooled state.

Another object of the present invention is to provide an apparatus for supercooling and a method of operating the same which can sense supercooling release of the apparatus for supercooling having a space for maintaining an object in a supercooled state, and restore the supercooling-released object into the supercooled state.

Yet another object of the present invention is to provide an apparatus for supercooling and a method of operating the same which can sense supercooling release of the apparatus for supercooling having a space for maintaining an object in a supercooled state, and prevent a malfunction of the apparatus for supercooling by the supercooling release.

Yet another object of the present invention is to provide an apparatus for supercooling and a method of operating the same which can use energy such as an electric field and a magnetic field, and intercept energy supply when a space for maintaining an object in a supercooled state is externally opened.

Technical Solution

In order to achieve the above-described objects of the invention, there is provided an apparatus for supercooling, including: a space cooled by cool air, for maintaining an inside object in a supercooled state by supply of energy preventing the object from being converted into a solid phase; a sensing unit for sensing supercooling release of the space or the object; and a heater engaged with the sensing unit, for applying heat to the space or the object. The supercooling release means that the object which has not been frozen below a phase transition temperature is converted into a solid phase due to interception of external force or energy supplied in the form of an electric field or a magnetic field. In the case that water is supercooled at −3° C., a temperature of water becomes 0° C. which is a phase transition temperature due to the supercooling release, and water is transited to solid phase slush. The sensing unit recognizes the supercooling release by sensing the variation of the temperature. The state variation of the object results in the variation of the applied electric field. This variation can be sensed by a current sensor. In addition, supercooling can be released by interception of energy supply, which can be sensed by a sensor for sensing interception of power supply. On the other hand, when supercooling is released, the slush state object can be converted into a lump of ice by cool air, which stops the operation of the apparatus. In this case, the heater is used to make the apparatus normally operated. The object is not necessarily water. A vegetable or meat contains water and can be supercooled in the same mechanism. Accordingly, the present invention is applicable to these objects. Even if the vegetable or meat is frozen due to the supercooling release, the operation of the apparatus is not stopped. However, since it is not advantageous to keep the frozen state for a long time, the heater is used to thaw the frozen object.

Preferably, the object is meat or fish, and the apparatus for supercooling further includes a storing chamber for forming the space. By this configuration, the apparatus for supercooling serves to keep general foods in the supercooled state like a refrigerator. The foods can be expanded to vegetables and fruits as well as addition to the meat or fishes.

The object is a supercooled liquid, and the apparatus for supercooling further includes a tray disposed to be supplied with the supercooled liquid from the space. By this configuration, the present invention can be applied to a general ice making structure of a refrigerator.

Preferably, the object is a supercooled liquid, and the apparatus for supercooling further includes a passage having an outlet for discharging the supercooled liquid supplied from the space. By this configuration, the present invention can be applied to a general dispenser structure of a refrigerator, for supplying a supercooled liquid.

Preferably, the sensing unit includes a sensor for sensing interception of energy.

Preferably, the sensing unit includes a sensor for sensing a temperature of the space or the object.

Preferably, the apparatus for supercooling further includes a sensor for sensing opening of the space. Opening of the space means that a door of the space or the space itself is externally exposed. To protect the user from energy such as an electric field as regulated by the law, the sensor senses opening of the space and intercepts energy supply.

Preferably, the sensing unit includes a sensor for sensing a current or voltage on the space or the object.

Preferably, the sensing unit includes a sensor for sensing hardness of the object.

Preferably, the apparatus for supercooling includes: a power source for generating cool air; an energy generator including an electric wire connected to the power source, and supplying energy to the space; and a circuit breaker for breaking the electric wire of the energy generator.

Preferably, the apparatus for supercooling includes: a storing unit including a door for opening and closing the storing unit and a power source for generating cool air, and supplying cool air to the space, the space being installed in the storing unit; an energy generator including an electric wire connected to the power source, and supplying energy to the space; and a circuit breaker for sensing opening of the door, and breaking the electric wire of the energy generator.

Preferably, the apparatus for supercooling includes a power source for generating cool air, and the sensing unit includes a means for deciding interception of the power source.

Preferably, the apparatus for supercooling includes: a storing unit for supplying cool air to the space, the space being installed in the storing unit; a door for opening and closing the storing unit; and a display installed on the door for displaying supercooling release.

According to another aspect of the present invention, there is provided a method of operating an apparatus for supercooling including a space for maintaining a supercooled state by supply of cool air and energy, the method including: a first step for sensing release of the supercooled state of the space or an object in the space; and a second step for applying heat to the space or the object.

Energy can be supplied to the object in the form of an electric field or a magnetic field. However, energy can be supplied in various types (for example, ultrasonic waves, magnetrons, etc.) so far as it maintains water contained in the object in the liquid phase below the phase transition temperature of water. It must be recognized that the present invention includes these types of energy.

BRIEF DESCRIPTION OF THE DRAWINGS

The present invention will become better understood with reference to the accompanying drawings which are given only by way of illustration and thus are not limitative of the present invention, wherein:

FIG. 1 is a structure view illustrating a conventional refrigerator including a dispenser;

FIG. 2 is a structure view illustrating a transparent ice maker disclosed under Korea Laid-Open Patent Official Gazette 2006-0013721;

FIGS. 3 and 4 are structure views illustrating a microwave oven for generating microwaves disclosed under Korea Laid-Open Patent Official Gazette 2005-0002271;

FIG. 5 is a concept view illustrating slush making in accordance with the present invention;

FIG. 6 is a graph showing one example of an experiment result in accordance with the present invention;

FIG. 7 is a structure view illustrating an apparatus for supercooling in accordance with one embodiment of the present invention;

FIGS. 8 and 9 are block diagrams illustrating a method of operating an apparatus for supercooling in accordance with the present invention;

FIG. 10 is a graph showing another example of the experiment result in accordance with the present invention;

FIG. 11 is a graph showing a temperature of the contents sensed by a temperature sensor;

FIGS. 12 to 14 are graphs showing data sensed by a current or voltage sensor;

FIG. 15 is a block diagram illustrating an apparatus for supercooling in accordance with another embodiment of the present invention;

FIG. 16 is a structure view illustrating a first example of the apparatus for supercooling of FIG. 15;

FIG. 17 is a structure view illustrating a second example of the apparatus for supercooling of FIG. 15; and FIG. 18 is a flowchart showing sequential steps of a method of operating an apparatus for supercooling in accordance with the present invention.

MODE FOR THE INVENTION

An apparatus for supercooling and a method of operating the same in accordance with the present invention will now be described in detail with reference to the accompanying drawings.

FIG. 5 is a concept view illustrating slush making in accordance with the present invention. Referring to FIG. 5, a liquid 41 which is a supercooling object is disposed between electrodes 40. In a state where cool air 42 is supplied, an electric field is applied to the liquid 41 by using an AC power source 43. Therefore, the liquid 41 is not frozen but supercooled below its phase transition temperature (for example, 0 C in water below 1 air pressure). Supply of energy such as an electric field causes continuous vibration, rotation and translation to water molecules and interrupts hydrogen combination of water. As a result, water consisting of oxygen and hydrogen is not frozen.

When external force is applied to the supercooled liquid by a phase converter 44, for example, when electric force is applied to the supercooled liquid by an electric igniter, the supercooled state maintained by the energy which is being applied to the supercooled liquid or the energy which has been applied to the supercooled liquid (it means that the supercooled state can be maintained although energy supply is interrupted after a predetermined time) is disturbed by the force. Accordingly, freezing cores are formed, and the supercooled liquid is rapidly converted into a solid phase, thereby generating slush. Here, a temperature of the supercooled liquid is changed from a supercooled state temperature to a phase transition temperature.

The experiment result of the present invention will now be explained.

1. Installation of Electrodes and Container

Two electrodes having width and length of 100 mm were installed at an interval of 200 mm. A container containing 1 L of water was positioned between the two electrodes at a predetermined interval.

2. Supercooling

The above apparatus was put in a refrigerator having a temperature of −6.98 C, and an electric field of 40 kHz and 2 kV was applied thereto. As soon as the apparatus was put into the refrigerator, the electric field was applied to the apparatus. After sufficient supercooling, the supercooled liquid was converted into a solid phase by using an electric igniter for 1500V electric lighter. The result was shown in FIG. 10.

FIG. 6 is a graph showing one example of the experiment result, especially, correlation between the applied power and the temperature of the supercooled liquid. As shown in FIG. 6, the applied power and the temperature of the supercooled liquid show almost linear proportion. It means that, in the given ambient temperature (for example, the temperature inside the refrigerator), the temperature of the supercooled liquid can be controlled by adjusting power applied from an energy generator.

FIG. 7 is a structure view illustrating an apparatus for supercooling in accordance with one embodiment of the present invention. A water tank 21, a tray 22 and a bank 23 are installed in order on a freezing chamber door 20. The freezing chamber door 20 has a latch 20a as a circuit breaker or a sensor for breaking a power source for supplying cool air in opening.

The water tank 21 is necessary to make a supercooled liquid. Electrodes 21a for applying electric field type energy are installed as an energy generator. A passage 21b is formed to supply water into the water tank 21, a valve 21c is formed to control water supply to the water tank 21, a passage 21d is formed to supply the supercooled water in the water tank 21 to the tray 22, and a valve 21e is formed to control supply of the supercooled water to the tray 22. A temperature sensor 21f is formed at one side of the water tank 21, for sensing a temperature of the supercooled water. In addition, a heater 21g is formed on the water tank 21, for preventing water from being frozen due to supercooling release. The heater 21g is a hot wire such as a coil or an apparatus using microwaves. In addition to the passage 21d, the water tank 21 includes a discharge passage (not shown) for discharging the supercooled water to a dispenser of a refrigerator, thereby supplying the supercooled water to the user.

The tray 22 is rotatably installed, and rotation of the tray 22 is controlled by a motor 22a. Preferably, the tray 22 is made of a conductive material such as aluminum. A heater 22b is formed at the lower portion of the tray 22 for ice separation. On the other hand, an electric igniter 22c is installed at one side of the tray 22 as a shock generator. The electric igniter 22c is disposed to apply an electric shock to the tray 22 or the supercooled water contained in the tray 22, thereby converting the supercooled liquid into a solid phase, namely, slush. The tray 22 is divided into a plurality of sections by partitions 22d. Grooves are formed on connecting units 22e to link the supercooled liquid together, so that the electric shock applied to a specific point can be transmitted to the whole supercooled water. A bank 23 is formed at the lower portion of the tray 22, for containing slush or ice supplied from the rotated tray 22.

FIGS. 8 and 9 are block diagrams illustrating a method of operating the apparatus for supercooling in accordance with the present invention. When the valve 21c is opened, water is supplied to the water tank 21. The supplied water is supercooled by cool air of a freezing chamber and electric field type energy generated by the electrodes 21a, and maintained below a phase transition temperature without phase transition. According to a command of the user or temperature measurement of the temperature sensor 21f, the valve 21e is opened to supply the supercooled water to the tray 22. The supercooled water is frozen without the operation of the electric igniter 22c, converted into slush by the operation of the electric igniter 22c and then frozen, or converted into slush by the operation of the electric igniter 22c. The tray 22 is rotated by the operation of the motor 22a, so that the slush or ice can be contained in the bank 23. As shown in FIG. 1, the motor 22a serves to rotate ejectors (not shown). It is also possible to supply the ice to the bank 23 by the operation of the ejectors without rotating the tray 22. When the ice is supplied to the bank 23, the heater 22b is operated to separate the ice from the tray 22.

A power source 29 supplies power to a control unit 30 as well as the other elements needing power, but is schematically shown in FIGS. 8 and 9. The power source 29 and the elements needing power are connected through an electric wire for current conductivity.

The apparatus for supercooling includes a cooling cycle 35 for cooling the water tank 21 or the space in which the water tank 21 is cooled (for example, a freezing chamber, a refrigerating chamber, etc.). The cooling cycle 35 uses indirect cooling or direct cooling. The cooling cycle 35 is well known to those skilled in the art, and thus detailed explanations thereof are omitted.

If excessive impact is applied to the freezing chamber door 20, supply of energy using the electrodes 21a is stopped, or the power source 29 is intercepted by power failure, the supercooled state of the water tank 21 or the space in which the water tank 21 is cooled can be released. It can be sensed by the temperature sensor 21f, a current sensor 29a and a power failure sensing unit 29b. Water supercooled at −3 C reaches 0 C which is the phase transition temperature due to the supercooling release, and becomes solid phase slush. The temperature sensor 21f senses the variation of the temperature, so that the apparatus can recognize the supercooling release.

FIG. 11 is a graph showing the temperature of water sensed by the temperature sensor.

As illustrated in FIG. 11, when a temperature inside the refrigerator, namely, a control temperature is maintained at about −7 C, the temperature of water is gradually lowered and sharply increased to the phase transition temperature before about −6 C. The sharp temperature rise of water to the phase transition temperature means phase transition of water. That is, water has been converted into ice. Therefore, the control unit 30 confirms the sharp temperature rise and the temperature rise to the phase transition temperature by the temperature sensed by the temperature sensor 21f, and decides that water has been frozen. That is, the control unit 30 decides that the supercooled state has been released.

FIGS. 12 to 14 are graphs showing data sensed by the current or voltage sensor.

Here, the data are acquired when the contents are water. When water kept in the supercooled state is instantaneously frozen, the current and power sharply increase. The current sensor 29a and the voltage sensor sense such variations and decide freezing of water by release of the supercooled state.

FIG. 12 is a graph showing variations of a power factor, FIG. 13 is a graph showing variations of power, and FIG. 14 is a graph showing variations of a current. Here, 20 kHz of AC voltage is applied. When the power factor, the power and the current sharply increase in each graph, freezing starts. When the control unit 30 confirms the sharp increase by the measured values of the current sensor 29a, the control unit 30 decides that water has been frozen.

A hardness sensor (not shown) can be used as a sensing means for sensing freezing by release of the supercooled state. If the contents start to be frozen, hardness of the contents sharply increases. When the sensed value of the hardness sensor sharply increases, it means that the contents have been frozen. The hardness sensor is mounted in the water tank 21 to contact water.

The state variation of the object results in the variation of the electric field. As described above, such a variation can be sensed by the current sensor 29a. In addition, supercooling can be released by interruption of energy supply or power failure. It can be sensed by the current sensor 29a or the power failure sensing unit 29b. The heater 21g is operated to prevent a malfunction of the apparatus by the supercooling release or restore the supercooled state. The operation of the heater 21g is controlled by the control unit 30.

On the other hand, in the case that the water tank 21 or the space in which the water tank 21 is cooled is externally opened, the latch 20a is used as the circuit breaker for intercepting power supplied to the electrodes 21a. Accordingly, the power source 29 is intercepted by a mechanical method. It is also preferable to intercept the power source 29 by forming a sensor for sensing opening of the space and engaging the sensor with the control unit 30. As shown in FIG. 7, when the space consists of the water tank 21, since the water tank 21 is not opened, opening of the freezing chamber door 20 can be engaged with interception of the power source 29. If the space having the electrodes 21 can be opened (by a door or sliding), the space includes a circuit breaker.

FIG. 15 is a block diagram illustrating an apparatus for supercooling in accordance with another embodiment of the present invention, FIG. 16 is a structure view illustrating a first example of the apparatus for supercooling of FIG. 15, and FIG. 17 is a structure view illustrating a second example of the apparatus for supercooling of FIG. 15.

The refrigerator 50 includes a freezing sensing unit 51 for sensing a frozen state (or release of a supercooled state) of the contents (not shown) stored in a storing space A or B, a heat source generating unit 52 for generating heat in the storing space A or B or the contents, a freezing cycle 53 for cooling the storing space A or B, a voltage generating unit 54 for generating a voltage to apply an electric field to the storing space A or B, an electrode unit 55 for receiving the voltage and generating the electric field, a door sensing unit 56 for sensing opening and closing of a door 74, an input unit 57 for enabling the user to input a degree of cooling, or selection of a supercooling control or freezing release control, a display unit 58 for displaying an operating state of the refrigerator 50, and a microcomputer (or control unit) 59 for controlling freezing or refrigerating of the refrigerator 50, and performing the supercooling control or the freezing release control. A power supply unit (not shown) is essentially installed to supply power to the aforementioned elements. However, power supply is easily recognized by those skilled in the art, and thus explanations thereof are omitted.

In detail, the freezing sensing unit 51 senses the frozen state of the contents cooled in a keeping mode or a non-freezing mode (supercooling mode). For example, when the contents having a liquid phase are kept below a phase transition temperature, the freezing sensing unit 50 senses phase transition of the contents. As described above, the freezing sensing unit 50 can be a temperature sensor for sensing a temperature of the contents, a voltage sensor or a current sensor for sensing a voltage or a current by an electric field flowing through the contents in the non-freezing mode, or a hardness sensor for deciding freezing by phase transition by sensing hardness of the contents.

The heat source generating unit 52 forcibly raises the temperature of the storing space A or B or the contents as in a ripening mode of the refrigerator 50. For example, a heater for raising the temperature of the contents by externally generating and transmitting heat to the contents, or a means for generating heat in the contents by applying electric waves such as microwaves to the contents can be used as the heat source generating unit 52.

The freezing cycle 53 is classified into indirect cooling and direct cooling according to a method of cooling the contents. FIG. 16 shows an indirect cooling type refrigerator and FIG. 17 shows a direct cooling type refrigerator, which will later be explained in detail.

The voltage generating unit 54 generates a DC voltage having a predetermined amplitude and an AC voltage having a predetermined amplitude and frequency. The voltage generating unit 54 can generate the AC voltage by varying at least one of the amplitude of the voltage and the frequency of the voltage. Especially, the voltage generating unit 54 applies the AC voltage generated according to the set values (amplitude of voltage, frequency of voltage, etc.) of the microcomputer 59 to the electrode unit 55, so that the resulting electric field can be applied to the storing space A or B.

The electrode unit 55 converts the AC voltage from the voltage generating unit 54 into the electric field, and applies the electric field to the storing space A or B. Generally, the electrode unit 55 is a plate or conductive wire made of Cu or Pt.

The electric field applied to the storing space A or B or the contents by the electrode unit 55 continuously vibrates, rotates and translates the water molecules containing O having polarity and H having +polarity. Accordingly, the water molecules can be maintained in the liquid phase below the phase transition temperature without crystallization.

The door sensing unit 56 stops the operation of the voltage generating unit 54 by opening of the door 74 for opening and closing the storing space A or B. The door sensing unit 56 can notify opening to the microcomputer 59 to perform the stop operation, or stop the voltage generating unit 54 by shorting cut power applied to the voltage generating unit 54.

The input unit 57 enables the user to input selection of the non-freezing mode or the freezing release mode for the storing space A or B or the contents as well as temperature setting for freezing and refrigerating control, selection of a service type (flake ice, water, etc.) of a dispenser, and selection of the keeping mode and the ripening mode.

The display unit 58 basically displays the freezing temperature, the refrigerating temperature and the service type of the dispenser, and additionally displays the keeping mode, the ripening mode, the frozen state, the non-freezing mode or the freezing release mode.

The microcomputer 59 basically controls freezing and refrigerating, and further executes the non-freezing mode and the freezing release mode according to the present invention.

The microcomputer 59 enables the voltage generating unit 54 to generate the set voltage and apply the voltage to the electrode unit 55, thereby executing the non-freezing mode. Here, the microcomputer 59 makes the voltage generating unit 54 generate the AC voltage having the set frequency and amplitude and apply the AC voltage to the electrode unit 55. The set voltage or the AC voltage can be applied when the kind of the contents stored in the storing space A or B is preset (for example, a meat storing space, a vegetable storing space, a fruit storing space, a wine storing space, etc.).

The microcomputer 59 recognizes the frozen state of the contents according to the sensed or measured value of the freezing sensing unit 51, and executes the freezing release mode. For example, to execute the freezing release mode can be to execute the keeping mode in the frozen state. In addition, the microcomputer 59 can release the frozen state by forcibly raising the temperature of the contents by operating the heat source generating unit 52 in addition to the keeping mode.

FIGS. 16 and 17 are structure views illustrating examples of the refrigerator in accordance with the present invention. FIG. 16 is a cross-sectional view illustrating an indirect cooling type refrigerator, and FIG. 17 is a cross-sectional view illustrating a direct cooling type refrigerator.

The indirect cooling type refrigerator includes a casing 70 having one surface opened, and including a storing space A inside and a shelf 73 for partially partitioning the storing space A, and a door 74 for opening and closing the opened surface of the casing 70.

A heat source generating unit 52 is formed in a hot wire type inserted into an inner surface 72b of the casing 70, like a heater.

A freezing cycle 53 of the indirect cooling type refrigerator includes a compressor 62 for compressing refrigerants, an evaporator 63 for generating cool air (indicated by arrows) for cooling the storing space A or the contents, a fan 64 for forcibly flowing the cool air, a suction duct 66 for supplying the cool air to the storing space A, and a discharge duct 68 for inducing the cool air passing through the storing space A to the evaporator 63. Although not illustrated, the freezing cycle 53 further includes a condenser, a drier and an expanding unit.

Electrode units 55a and 55b are formed between the inner surfaces 72a and 72c facing the storing space A and the outer surface of the casing 70. The electrode units 55a and 55b are installed to face the storing space A, for applying an electric field to the whole storing space A. The storing space A is separated from the ends of the electrode units 55a and 55b at predetermined intervals in the inner or center directions of the electrode units 50a and 50b, for applying the uniform electric field to the storing space A or the contents.

The suction duct 66 and the discharge duct 68 are formed on the inner surface 72b of the casing 70 to be isolated from the heat source generating unit 52 at a predetermined interval. The inner surfaces 72a, 72b and 72c of the casing 70 are made of a hydrophobic material, and thus not frozen during the non-freezing mode due to reduction of surface tension of water. The outer surface and the inner surfaces 72a, 72b and 72c of the casing 70 are made of an insulating material, thereby preventing the user from receiving an electric shock from the electrode units 55a and 55b, and preventing the contents from electrically contacting the electrode units 50a and 50b through the inner surfaces 72a, 72b and 72c.

A casing 70, a door 74, a shelf 73 and a heat source generating unit 52 of the direct cooling type refrigerator of FIG. 17 are identical to those of the indirect cooling type refrigerator of FIG. 16. Inner surfaces 74a, 74b and 74c of the casing 70 are identical to the inner surfaces 72a, 72b and 72c of the casing 70 except for the suction duct 66 and the discharge duct 68.

A freezing cycle 53 of the direct cooling type refrigerator of FIG. 17 includes a compressor 62 for compressing refrigerants, and an evaporator 69 installed in the casing 70 adjacently to the inner surfaces 74a, 74b and 74c of the casing 70 around the storing space B, for evaporating the refrigerants. The direct cooling type freezing cycle 53 includes a condenser (not shown) and an expansion valve (not shown).

Especially, electrode units 55a and 55d are inserted between the evaporator 69 and the casing 70, for preventing cool air from being intercepted by the evaporator 69.

FIG. 18 is a flowchart showing sequential steps of a method of operating an apparatus for supercooling in accordance with the present invention. FIG. 18 corresponds to the apparatus for supercooling of FIG. 8.

In detail, in S151, the control unit 30 controls water in the water tank 21 in the supercooled state by cooling the water tank 21 containing water and applying electric field energy to the water tank 21.

In S152, the control unit 30 decides whether the supercooled state has been released. As described above, release of the supercooled state is caused when supply of energy using the electrodes 21a is stopped by the operation of the circuit breaker 20a, the power source 29 is intercepted by power failure, excessive impact is applied to the freezing chamber door 20, or the water tank 21 or the space is frozen due to another factor. The control unit 30 can decide release of the supercooled state according to the measured values of the current sensor 29a, the power failure sensing unit 29b, the temperature sensor 21f, the hardness sensor and the voltage sensor. If the supercooled state is released, the control unit 30 goes to S153, and if not, the control unit 30 continuously performs S151.

In S153, the control unit 30 generates heat in water in the water tank 21 by operating the heater 21g, thereby raising the temperature of water to at least the phase transition temperature. Since the supercooling-released water has been frozen or may be frozen, the control unit 30 generates or supplies heat. In this step S153, if cool air is continuously supplied to water in the supercooling release state, freezing of water is accelerated. Therefore, the control unit 30 controls the cooling cycle 35 not to additionally supply cool air.

In S154, the control unit 30 decides whether freezing of water in the water tank 21 has been released, by checking the temperature rise of water to the phase transition temperature or using the process of deciding the frozen state in S152. If freezing is released, the control unit 30 goes to S151 and re-performs supercooling control by supplying cool air and electric field energy. If not, the control unit 30 continuously performs S153.

In accordance with the present invention, the apparatus for supercooling and the method of operating the same can sense the supercooling release of the apparatus for supercooling having the space for maintaining the object in the supercooled state.

The apparatus for supercooling and the method of operating the same can sense the supercooling release of the apparatus for supercooling having the space for maintaining the object in the supercooled state, and restore the supercooling-released object into the supercooled state.

The apparatus for supercooling and the method of operating the same can sense the supercooling release of the apparatus for supercooling having the space for maintaining the object in the supercooled state, and prevent the malfunction of the apparatus for supercooling by the supercooling release.

The apparatus for supercooling and the method of operating the same can use energy such as the electric field and the magnetic field, and intercept energy supply when the space for maintaining the object in the supercooled state is externally opened.

The apparatus for supercooling and the method of operating the same can minimize damages of the contents by sensing and releasing the frozen state of the contents.

The apparatus for supercooling and the method of operating the same can maintain the contents in the non-frozen state by supercooling, by re-executing the non-freezing mode after release of the frozen state.

Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. An apparatus for supercooling, comprising:
   a space cooled by cool air, for maintaining an inside object in a supercooled state preventing the object from being converted into a solid phase;
   a sensing unit for sensing a temperature of the space or the object cooled in the supercooled state;
   a heater for applying heat to the space or the object; and
   a control unit for deciding a frozen state of the object according to the sensed temperature, raising the temperature of the object by controlling the heater when the object is frozen, deciding whether freezing of the object is released according to the sensed temperature and re-performing supercooling control by supplying cool air and energy when freezing is released.

2. The apparatus for supercooling of claim 1, further comprising a storing chamber for forming the space.

3. The apparatus for supercooling of claim 1, further comprising a tray disposed to be supplied with the supercooled liquid from the space.

4. The apparatus for supercooling of claim 1, further comprising a passage having an outlet for discharging the supercooled liquid supplied from the space.

5. The apparatus for supercooling of claim 1, further comprising a sensor for sensing opening of the space.

6. The apparatus for supercooling of claim 1, wherein the sensing unit comprises a sensor for sensing a current or voltage on the space or the object.

7. The apparatus for supercooling of claim 1, comprising:
   a power source for generating cool air;
   an energy generator including an electric wire connected to the power source, and supplying energy to the space; and
   a circuit breaker for breaking the electric wire of the energy generator.

8. The apparatus for supercooling of claim 1, comprising:
   a storing unit including a door for opening and closing the storing unit and a power source for generating cool air, and supplying cool air to the space, the space being installed in the storing unit;
   an energy generator including an electric wire connected to the power source, and supplying energy to the space; and
   a circuit breaker for sensing opening of the door, and breaking the electric wire of the energy generator.

9. The apparatus for supercooling of claim 1, comprising a power source for generating cool air, wherein the sensing unit comprises a means for deciding interception of the power source.

10. The apparatus for supercooling of claim 1, comprising:
    a storing unit for supplying cool air to the space, the space being installed in the storing unit;
    a door for opening and closing the storing unit; and
    a display installed on the door for displaying supercooling release.

11. A method of operating an apparatus for supercooling including a space for maintaining a supercooled state by supply of cool air and energy, the method comprising:
    a first step for sensing a temperature of the space or the object cooled in the supercooled state;
    a second step for applying heat to the space or the object when the object is frozen;
    a third step for deciding freezing release of the space or the object; and
    a fourth step for re-performing supercooling control when freezing is released.

12. The method of claim 11, wherein the second step comprises a step for intercepting supply of cool air.

13. The method of claim 11, wherein the first step senses power failure of the apparatus for supercooling.

14. The method of claim 11, wherein the first step senses interception of energy supply.

15. The method of claim 11, wherein the first step senses release of the supercooled state by deciding freezing of the space or the object.

* * * * *